United States Patent [19]

Pedemonte et al.

[11] Patent Number: 6,159,251
[45] Date of Patent: Dec. 12, 2000

[54] DYE MIXTURES OF FIBER-REACTIVE AZO DYES AND USE THEREOF FOR DYEING MATERIAL CONTAINING HYDROXY-AND/OR CARBOXAMIDO GROUPS

[75] Inventors: Ron Pedemonte, Eppstein-Vockenhausen; Joachim Steckelberg, Hofheim; Christian Schumacher, Kelkheim, all of Germany

[73] Assignee: Dystar Textilfarbon GmbH & Co. Deutschland KG, Germany

[21] Appl. No.: 09/410,965

[22] Filed: Oct. 5, 1999

[51] Int. Cl.$^7$ ............................. C09B 67/24; D06P 1/384
[52] U.S. Cl. ........................................ 8/639; 8/641; 8/918
[58] Field of Search ............................... 8/549, 641, 918

[56] References Cited

U.S. PATENT DOCUMENTS 5,611,821  3/1997  Huang et al. .

FOREIGN PATENT DOCUMENTS 1911427  5/1979  Germany .
1302519  1/1973  United Kingdom .

*Primary Examiner*—Margaret Eisnmann
*Attorney, Agent, or Firm*—Connolly Bove Lodge & Hutz LLP

[57] ABSTRACT

The present invention provides a mixture of dyes which comprise one or more monoazo dyestuffs corresponding to the general formula (1) and one or more monoazo dyestuffs corresponding to the formula (2)

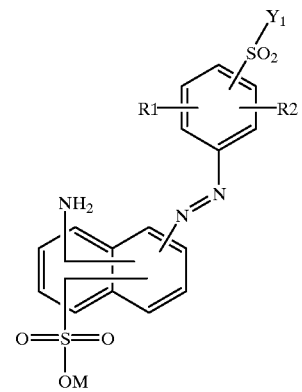

(1)

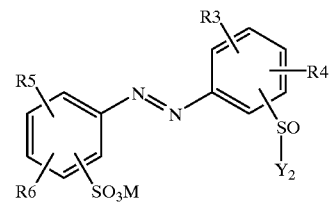

(2)

wherein R1, R2, R3, R4, R5, R6, $Y_1$, $Y_2$ and M are defined as given in claim 1, methods for preparing said dye mixtures and methods for dyeing hydroxy and/or carboxamido-containing materials using said dye mixtures.

7 Claims, No Drawings

DYE MIXTURES OF FIBER-REACTIVE AZO DYES AND USE THEREOF FOR DYEING MATERIAL CONTAINING HYDROXY-AND/ OR CARBOXAMIDO GROUPS

DESCRIPTION

The present invention relates to the field of fiber-reactive dyes. It describes golden yellow to orange mixtures of fiber-reactive monoazo dyestuffs and use thereof for dyeing hydroxy- and/or carboxamido-containing fiber material.

The dyes according to the general formulae (1) are known from the German Patent No. 1911427. The dyes according to the general formulae (2) are known from the European Patent No. 73 481. Mixtures comprising dyes of the formula (1), formula (2) and a black reactive dye are known from the U.S. Pat. No. 5,611,821.

The mixtures comprising dyes of formula (1) and formula (2) provide advantages, such as color build-up and solubility in an aqueous dyebath in the presence of alkali and electrolyte salts over the individual dyes represented by formula (1) or formula (2).

The present invention concerns dye mixtures of fiber-reactive azo dyes, suitable for dyeing hydroxy- and/or carboxamido-containing material in golden yellow to orange shades, which comprise one or more monoazo dyestuffs corresponding to the general formula (1) and one or more monoazo dyestuffs corresponding to the formula (2)

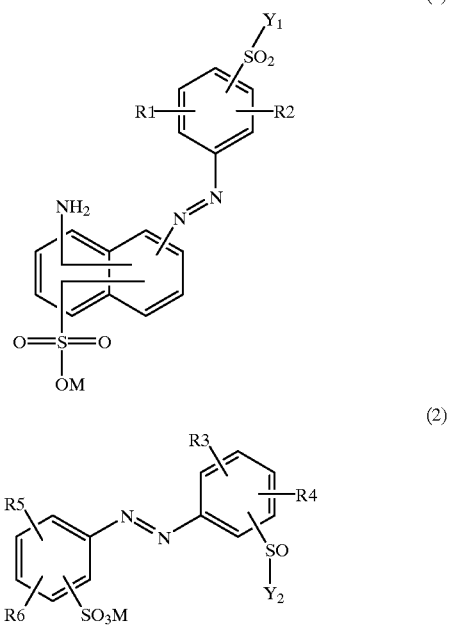

wherein
R1 denotes hydrogen, methyl, ethyl, methoxy, ethoxy, sulfo or carboxy;
R2 has one of the meanings of R1;
R3 has one of the meanings of R2;
R4 has one of the meanings of R3;
R5 denotes hydrogen, amino, methyl, ethyl, methoxy, ethoxy, or NHX, whereby
X is substituted or unsubstituted $C_1$–$C_4$ acyl or substituted or unsubstituted benzoyl, phthaloyl or aminocarbonyl in which the preferred substituents are carboxy or sulfo;

R6 has one of the meanings of R5, provided that R5 and R6 are not simultaneously hydrogen;
$Y_1$ is vinyl or is ethyl which is substituted in the i-position by a substituent which is eliminated by the action of an alkali, forming the vinyl group;
$Y_2$ has one of the meanings of $Y_1$;
M. is hydrogen or an alkali metal, such as lithium, sodium and potassium;

The formulae mentioned above and in those below the individual formula members, both with different and with the same designation within a formula, can within the scope of their definition have meanings which are the same as or different from one another.

A substituent standing for X is, for example, acetyl, propanoyl, benzoyl, phthaloyl or aminocarbonyl.

In preferred dye mixtures R1 is hydrogen, methoxy or methyl, R2 is hydrogen or methoxy, R3 is hydrogen, methoxy or methyl, R4 is hydrogen or methoxy and R5 is amino or acetylamino and R6 is amino.

A substituent in the β-position of ethyl standing for $Y_1$ or $Y_2$ is, for example, chlorine, thiosulfato, sulfato, alkanoyloxy of 2 to 5 carbon atoms, phosphate, sulfobenzoyloxy or p-toluylsulfonyloxy and $Y_1$ or $Y_2$ are preferably vinyl, β-chloroethyl, β-thiosulfatoethyl or β-sulfatoethyl and $Y_1$ or $Y_2$ are preferably vinyl or β-sulfatoethyl.

The groups "sulfo", "thiosulfato", "phosphate" and "sulfato" include both the acid form and the salt form of these groups. Accordingly, sulfo groups are groups of the formula —$SO_3M$, thiosulfato groups are groups of the formula —S—$SO_3M$, phosphato groups are groups of the formula —$OPO_3M_2$, and sulfato groups are groups of the formula —$OSO_3M$, in which M is defined as above.

Alkanoyloxy are groups of the formula RCOO—, sulfobenzoyloxy groups are groups of the formula $HO_3SC_6H_4COO$—, p-toluylsulfonyloxy are groups of the formula $CH_3C_6H_4SO_2O$—.

The inventive dye mixture can contain dyes of the same chromophore conforming to the formula (1) and/or dyes of the same chromophore conforming to formula (2) in which the fiber-reactive groups —$SO_2$—$Y_1$ and —$SO_2$—$Y_2$, respectively, are partly vinylsulfonyl groups and partly β-chloroethylsulfonyl or β-thiosulfatoethylsulfonyl or preferably β-sulfatoethylsulfonyl groups. If the inventive dye mixtures contain the respective dye components in the form of a vinylsulfonyl dye, the proportion of the respective vinylsulfonyl dye to the respective β-chloro- or β-thiosulfato- or β-sulfatoethyl-sulfonyl dye will be up to about 30 mol- %, based on the respective dye chromophore.

Preference is given to inventive dye mixtures in which the proportion of vinylsulfonyl dye to the β-sulfatoethylsulfonyl dye is in terms of the molar ratio between 5:95 and 30:70.

In general, the azo dyestuff or dyestuffs of the formula (1) are contained in the mixture in quantity 80 to 20% and the azo dyestuff or dyestuffs of the formula (2) are contained in the mixture in a mixing ratio of 20 to 80% by weight, preferably in a mixing ratio of 70% : 30% by weight to 30% : 70% by weight.

The dye mixtures of the invention can be prepared in solid or in liquid (dissolved) form. In solid form they generally contain the electrolyte salts customary in the case of water-soluble and in particular fiber-reactive dyes, such as sodium chloride, potassium chloride and sodium sulfate, and also assistants customary in commercial dyes, such as buffer substances capable of establishing a pH in aqueous solution between 3 and 7, such as sodium acetate, sodium borate, sodium bicarbonate, sodium citrate, sodium dihydrogenphosphate and disodiumhydrogenphosphate, small amounts of siccatives or if, they are present in liquid, aqueous solution (including the presence of thickeners of the type customary in print pastes), substances which ensure the permanence of these preparations, for example mold preventatives.

In general, the dye mixtures will take the form of dye powders containing from 10 to 80% by weight, based on the dye powder or preparation, of a strength-standardizing colorless diluent electrolyte salt. These dye powders may in addition contain the abovementioned buffer substances in a total amount of up to 5%, based on the dye powder. If the dye mixtures of the invention are present in aqueous solution, the total dye content of these aqueous solutions is up to about 50% by weight, for example between 5 and 50% by weight, the electrolyte salt content of these aqueous solutions preferably being below 10% by weight, based on the aqueous solution; the aqueous solutions (liquid preparations) can in general contain the abovementioned buffer substances in an amount of up to 5% by weight, preferably up to 2% by weight.

The dye mixtures of this invention can be obtained in a conventional manner, for instance by mechanically mixing the individual dyes in solid form or in form of aqueous solutions in the required proportions or if the amines of formulae (3) and (4) are equivalent, by synthesis, by means of the customary diazotization and coupling reactions using appropriate mixtures of the diazo components of the formulae (3) and (4) and coupling components of the formulae (5) and (6) respectively in a manner familiar to those skilled in the art and the necessary proportions.

Diazo components of the formulae (3) and (4) giving after diazotization and

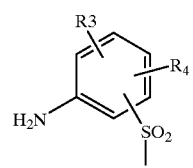

(3)

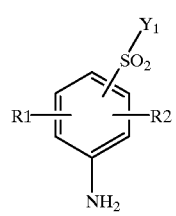

(4)

coupling the azo dyestuffs of the formulae (1) and (2) are, for example, 3-(β-sulfatoethylsulfonyl)-aniline, 4-(β-sulfatoethylsulfonyl)-aniline, 2-methyl-5-(β-sulfatoethylsulfonyl)-aniline, 2-methoxy-5-(β-sulfatoethylsulfonyl)-aniline, 4-methyl-3-5 (β-sulfatoethylsulfonyl)-aniline, 2,5-dimethyl-(β-sulfatoethyl-sulfonyl)-aniline, 2,6-dimethyl-4-(β-sulfatoethylsulfonyl)-aniline, 2-methoxy-4-(β-sulfatoethylsulfonyl)-aniline, 4-methoxy-5-(β-sulfatoethylsulfonyl)-aniline, 2,4-dimethoxy-5-(β-sulfatoethylsulfonyl)-aniline, 2,5-dimethoxy-4-(β-sulfatoethylsulfonyl)-aniline, 6-(β-sulfatoethylsulfonyl)-1-sulfo-naphthyl-2-yl -amine and 8-(β-sulfatoethylsulfonyl)-6-sulfonaphthylamine, and of these in particular 4-(β-sulfatoethylsulfonyl)-aniline, and derivatives of these radicals in which the β-sulfatoethylsulfonyl group is replaced by the vinylsulfonyl or β-thiosulfatoethysulfonyl or β-chloroethylsulfonyl group.

Representative coupling components of the formulae (5)

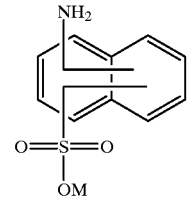

(5)

for the preparation of the azo dyestuffs of the formula (1) are, for example, 1 -Aminonaphthalene4-sulfonic acid, 1 -Aminonaphthalene-3-sulfonic acid, 1 -Aminonaphthalene-5-sulfonic acid, 1-Aminonaphthalene-6-sulfonic acid, 1-Aminonaphthalene-7-sulfonic acid, 1-Aminonaphthalene-8-sulfonic acid, 2-Aminonaphthalene4-sulfonic acid, 2-Aminonaphthalene-5-sulfonic acid, 2-Aminonaphthalene-6-sulfonic acid, 2-Aminonaphthalene-7-sulfonic acid, or 2-Aminonaphthalene-8-sulfonic acid.

Representative coupling components of the formulae (6)

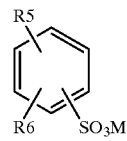

(6)

for the preparation of the azo dyestuffs of the formula (2) are, for example, 3-Aminotoluene, 3-Aminoanisidine, 1,3-Diaminobenzene, 2,4-Diamino-benzeneulfonic acid, 2,5 Diaminobenzenesulfonic acid, 3'-Aminoacetanilide, 3'-Amino-4'sulfoacetanilide, 3'-Aminophenylurea, or 3'-Amino-4'-Sulfophenylurea.

The dye mixtures according to the invention have valuable properties. They are used for dyeing (which includes printing) materials containing hydroxy and/or carboxamide groups, for example in the form of sheet-like structures, such as paper and leather, or of films, such as, for example, of polyamide, or in bulk, such as, for example, polyamide and polyurethane, but in particular these materials in fiber form. The solution of the dye mixtures according to the invention obtained during synthesis of their individual azo dyes can also be used for dyeing directly as a liquid preparation, if appropriate after addition of a buffer substance and if appropriate also after concentration or dilution.

The present invention thus also relates to the use of the dye mixtures according to the invention for dyeing these materials and to processes for dyeing such materials by procedures which are customary per se in which a dye mixture according to the invention is employed as the coloring agent. So, the dye mixtures according to the invention are applied to and fixed on the substrates mentioned, in particular the fiber materials mentioned, by the application techniques known for water-soluble dyestuffs, in particular for fiber-reactive dyestuffs, and they are fixed on these materials in particular by the action of an alkaline reacting agent or by the action of heat or by both measures. The materials are preferably used in the form of fiber materials, in particular in the form of textile fibers, such as woven fabrics or yarns, such as in the form of hanks or wound packages.

Materials containing hydroxy groups are those of naturally occurring or synthetic origin, such as, for example, cellulose fiber materials or regenerated products thereof, and polyvinyl alcohols. Cellulose fiber materials are preferably cotton, but also other plant fibers, such as linen, hemp, jute and ramie fibers; regenerated cellulose fibers are, for example, viscose staple and filament viscose.

Materials containing carboxamide groups are, for example, synthetic and naturally occurring polyamides and polyurethanes, in particular in the form of fibers, for example wool and other animal hair, silk, leather, nylon 6,6, nylon 6, nylon 11, and nylon 4.

Dyeings with very good color yields which are improved with respect to the individual dyestuffs are those obtained with them on cellulose fibers by the exhaustion process for a long liquor ratio using the most diverse acid-binding agents and if appropriate neutral salts, such as sodium chloride or sodium sulfate. Dyeing is preferably carried out in an aqueous bath at temperatures between 40 and 105° C., if appropriate at a temperature of up to 130° C. under pressure, and if appropriate in the presence of customary dyeing auxiliaries. A procedure can be followed here in which the material is introduced into the hot bath, this is gradually heated to the desired dyeing temperature and the dyeing process is brought to completion at this temperature. If desired, the neutral salts which accelerate exhaustion of the dyestuffs can also be added to the bath only after the actual dyeing temperature has been reached.

Very good color yields and a very good color build-up are likewise obtained by the padding process on cellulose fibers, it being possible for the dyeings to be fixed in the customary manner by batching at room temperature or elevated temperature, for example up to about 60° C., by steaming or with dry heat.

Strong prints with a good contour level and a clear white background are likewise obtained by the customary printing processes for cellulose fibers, which can be carried out in one phase, for example by printing with a printing paste comprising sodium bicarbonate or another acid binding agent and subsequent steaming at 100 to 103° C., or in two phases, for example by printing with neutral or weakly acid printing ink and subsequent fixing either by passing the goods through a hot electrolyte-containing alkaline bath or by over-padding with an alkaline electrolyte-containing padding liquor and subsequent batching or steaming or dry heat treatment of the material over-padded under alkaline conditions. The printing result depends only little on the varying fixing conditions.

Hot air at 120 to 200° C. is used for fixing by means of dry heat by the customary thermofixing processes. In addition to customary steam at 101 to 103° C., it is also possible to employ superheated steam and pressurized steam at temperatures of up to 160° C.

The acid-binding agents and the agents which effect fixing of the dyestuffs of the dye mixtures according to the invention to the cellulose fibers are, for example, water-soluble basic salts of the alkali metals and likewise alkaline earth metals with inorganic or organic acids, or compounds which liberate alkali under the influence of heat. The alkali metal hydroxides and alkali metal salts of weak to moderately strong inorganic or organic acids are to be mentioned in particular, the alkali metal compounds preferably meaning sodium and potassium compounds. Such acid-binding agents are, for example, sodium hydroxide, potassium hydroxide, sodium carbonate, sodium bicarbonate, potassium carbonate, sodium formate, sodium dihydrogen phosphate, disodium hydrogen phosphate, sodium trichloroacetate, water-glass or trisodium phosphate.

The dye mixtures according to the invention are distinguished by a high fixing yield when used in dyeing and printing processes on cellulose fiber materials. After customary after-treatment by rinsing to remove non-fixed portions of dyestuff, the dyeings on cellulose show excellent wet-fastnesses, especially since non-fixed portions of dyestuff can easily be washed out because of their good solubility in cold water. The dyeings and prints obtained have clear shades; in particular, the dyeings and prints on cellulose fiber materials have a good lightfastness and very good wet-fastnesses, such as fastness to washing, milling, water, seawater, cross-dyeing and acid and alkaline perspiration, and furthermore a good fastness to pleating, fastness to ironing and fastness to rubbing.

The dye mixtures according to the invention can furthermore also be used for fiber-reactive dyeing of wool. Wool which has been given an antifelting or low-felting treatment (cf., for example, H. Rath, Lehrbuch der Textilchemie (Textbook of Textile Chemistry), Springer-Verlag, 3rd edition (1972), pages 295–299, in particular treatment by the so-called Hercoseft process (page 298), J. Soc. Dyers and Colourists 1972, 93–99, and 1975, 33–44) can also be dyed with very good fastness properties.

The process for dyeing wool is carried out here by the customary and known dyeing procedure from an acid medium. Thus, for example, acetic acid and/or ammonium sulfate or acetic acid and ammonium acetate or sodium acetate can be added to the dyebath in order to obtain the desired pH. To achieve a usable levelness of the dyeing, it is advisable to add customary leveling auxiliaries, such as, for example, those based on a reaction product of cyanuric chloride with 3 times the molar amount of an aminobenzenesulfonic acid, or based on a reaction product of, for example, stearylamine with ethylene oxide. Thus, for example, the dye mixture according to the invention is preferably first subjected to the exhaustion process from and acid dyebath with a pH of about 3.5 to 5.5, the pH being controlled, and, towards the end of the dyeing time, the pH is shifted into the neutral and, if appropriate, weakly alkaline range up to a pH of 8.5, in order to bring about a complete reactive bond between the dyestuffs of the dye mixtures and the fiber in particular to achieve good depths of color. At the same time, the dyestuff portion which has not been bonded reactively is dissolved off.

The procedure described here also applies to the production of dyeings on fiber materials of other naturally occurring polyamides or of synthetic polyamides and polyurethane. As a rule, the material to be dyed is introduced into the bath at a temperature of about 40° C. and agitated therein for some time, the dyebath is then adjusted to the desired weakly acidic pH, preferably with acetic acid, and the actual dyeing carried out at a temperature between 60 and 98° C. The dyeings can also be carried out at the boiling point or in closed dyeing apparati at temperatures of up to 106° C. Since the water-solubility of the dye mixtures according to the invention is very good, they can also advantageously be employed in customary continuous dyeing processes.

The dye mixtures according to the invention afford clear yellowish-tinged to reddish-tinged orange dyeings on the materials mentioned, preferably fiber materials.

The following Examples serve to illustrate the invention. The parts are parts by weight and the precentage data are precentages by weight, unless stated otherwise. Parts by weight bear the same relation to parts by volume as the kilogram to the liter. The compounds described by their formulae in the Examples are shown in the form of free acids; they are in general prepared and isolated in the form of their salts, in particular alkali metal salts, preferably sodium or potassium salts, and used for dyeing in the form of their salts.

EXAMPLE 1

A dye mixture according to the invention is obtained by mixing in a mechanical mixer 150 parts of an orange electrolyte-salt containing dyestuff of formula (A), prepared similarly to the method described in the German Patent No. 1911427 in a proportion of 50% with 50 parts of a yellow electrolyte-salt containing dyestuff of formula (B), prepared similarly to the method described in the European Patent No. 668328, in a proportion of 50%. The resulting dye mixture of the invention, when employed by the application and fixing methods customary in the art for fiber-reactive dyes, produces on cellulose fiber materials, for example dyeings and prints in deep orange shades.

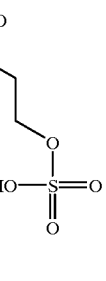

(A)

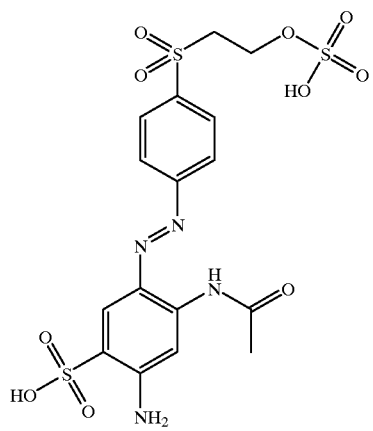

(B)

EXAMPLE 2

A dye mixture according to the invention is obtained by mixing in a mechanical mixer 132 parts of an orange electrolyte-salt containing dyestuff of formula (A) in a proportion of 50% with 66 parts of a yellow electrolyte-salt containing dyestuff of formula (B) in a proportion of 50%. The resulting dye mixture of the invention, when employed by the application and fixing methods customary in the art for fiber-reactive dyes, produces on cellulose fiber materials, for example dyeings and prints in deep yellowish-tinged orange shades. This mixture also exhibits very good dyestuff properties.

EXAMPLE 3

A dye mixture according to the invention is obtained by synthesis in the following manner. 281 parts of 4-(β-Sulfatoethylsulfonyl)aniline is diazotized in dilute mineral acid solution with a 40% aqeous Sodium Nitrite solution. The resulting diazonium suspension is added to an neutral, aqueous suspension of 111 parts of 4-Aminonaphthalene-1-sulfonic acid and 115 parts of 3'-Amino-4'sulfoacetanilide. Once the coupling is complete, the resulting dye solution is made weakly acidic and warmed to 30–50° C. for 1 hour. The dye solution is then clarified and spray-dried to afford dye mixture according to the invention, which contains 50% of a dye of formula (A) and 50% of a dye of formula (B). When employed by the application and fixing methods customary in the art for fiber-reactive dyes, this dye mixture produces on cellulose fiber materials, for example dyeings and prints in deep golden-orange shades.

This mixture also exhibits very good dyestuff properties.

EXAMPLES 4 to 20

Further dye mixtures according to the invention of monoazo dyestuffs conforming to the general formulae (1) and (2) are described with the aid of their components in the following Tabular Examples. They can be prepared in the manner according to the invention either by mechanical mixing of the individual dyestuffs or else by a chemical route, for example analogously to one of the above Embodiment Examples. The numerical ratios stated in the column WR indicate the weight ratio in percent of the dyestuff or dyestuffs of the formula (1) to the dyestuff or dyestuffs of the formula (2) in the particular dye mixture.
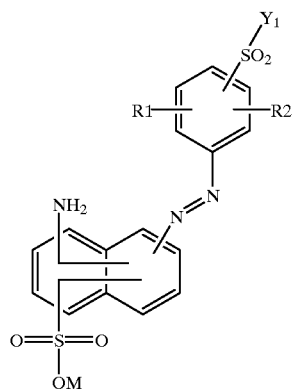
(1)
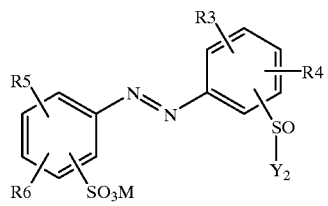
(2)
EXAMPLES 4–25
| Ex. | Dye of Formula (1) | Dye of Formula (2) | WR (1:2) |
|---|---|---|---|
| 4 | ![dye1] | ![dye2] | 75:25 |
| 5 | " | " | 50:50 |
| 6 | ![dye3] | " | 75:25 |

-continued
| Ex. | Dye of Formula (1) | Dye of Formula (2) | WR (1:2) |
|---|---|---|---|
| 7 | 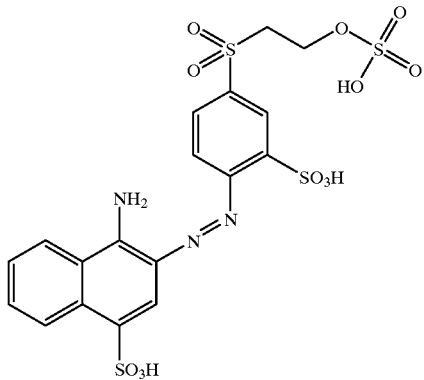 | " | 66:33 |
| 8 | 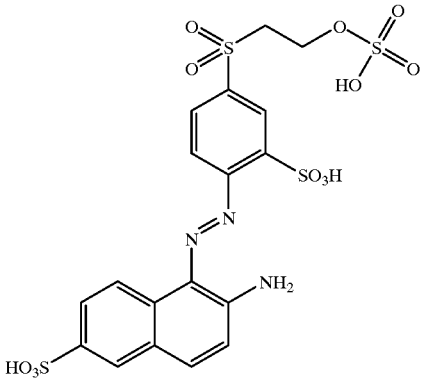 | " | 70:30 |
| 9 | 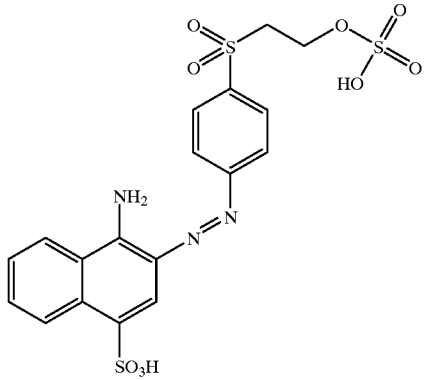 | 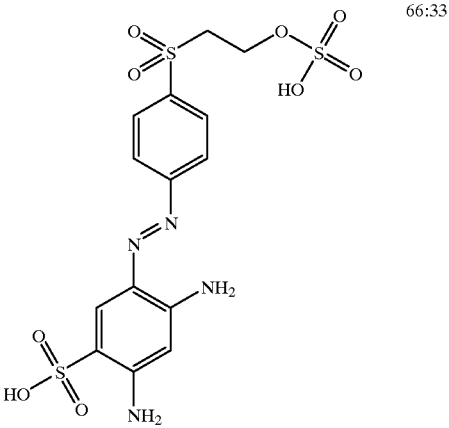 | 66:33 |

-continued

| Ex. | Dye of Formula (1) | Dye of Formula (2) | WR (1:2) |
|---|---|---|---|
| 10 | (structure: 4-(2-sulfatoethylsulfonyl)phenyl-azo-1-amino-4-sulfo-naphthalene) | (structure: 4-(2-sulfatoethylsulfonyl)phenyl-azo-benzene with NH-C(O)-NH$_2$, SO$_3$H, and NH$_2$ substituents) | 60:40 |
| 11 | " | " | 75:25 |
| 12 | (structure: 4-(2-sulfatoethylsulfonyl)-2-sulfo-phenyl-azo-1-(2-amino-6-sulfo)naphthalene) | " | 50:50 |
| 13 | (structure: 4-(2-sulfatoethylsulfonyl)-2-sulfo-phenyl-azo-1-(2-amino-5-sulfo)naphthalene) | " | 66:33 |

-continued
| Ex. | Dye of Formula (1) | Dye of Formula (2) | WR (1:2) |
|---|---|---|---|
| 14 | 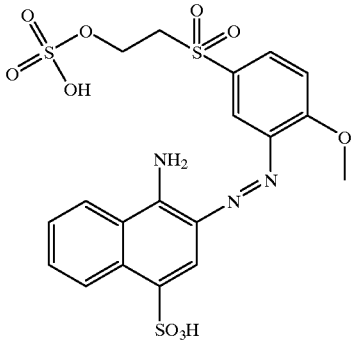 | 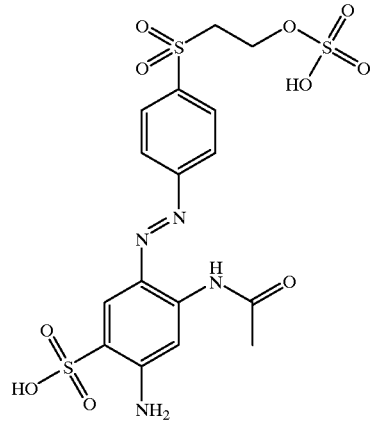 | 50:50 |
| 15 | " | 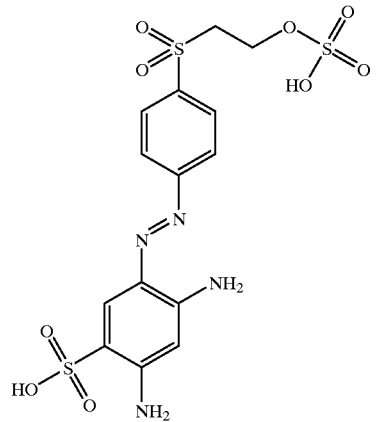 | 60:40 |
| 16 | " | 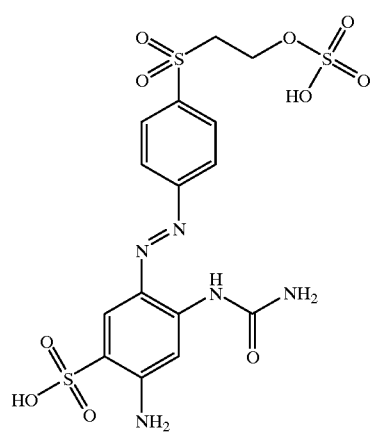 | 40:60 |

-continued

| Ex. | Dye of Formula (1) | Dye of Formula (2) | WR (1:2) |
|---|---|---|---|
| 17 | (structure) | (structure) | 75:25 |
| 18 | " | (structure) | 70:30 |
| 19 | " | (structure) | 70:30 |

-continued

| Ex. | Dye of Formula (1) | Dye of Formula (2) | WR (1:2) |
|---|---|---|---|
| 20 | (structure) | (structure) | 60:40 |
| 21 | (structure) | (structure) | 67:33 |
| 22 | " | (structure) | 50:50 |

-continued

| Ex. | Dye of Formula (1) | Dye of Formula (2) | WR (1:2) |
|---|---|---|---|
| 23 | [structure: naphthalene with NH2, SO3H, azo linkage to phenyl-SO2CH2CH2OSO3H] | [structure: benzene with NH2, SO3H, NHC(O)CH2CH3, azo linkage to phenyl-SO2CH2CH2OSO3H] | 70:30 |
| 24 | " | [structure: benzene with NH2, SO3H, NHC(O)-phenyl-COOH, azo linkage to phenyl-SO2CH2CH2OSO3H] | 60:40 |
| 25 | " | [structure: benzene with NH2, SO3H, NHC(O)CH2CH3, azo linkage to phenyl-SO2CH2CH2OSO3H] | 50:50 |

The dyes of the invention were evaluated by exhaust dyeing cotton test specimens. Exhaust dyeing is well known in the art. Various dye mixtures in this invention were dyed over a set of defined concentrations describe individual dyestuffs of the dye mixtures. The color yield of each versus evaluated by a computer assisted spectrophotometric method known in the art. The color yield is expressed in color density units (CDU's). The CDU's were then normalized by actual dyestuff content to the dye represented by Formula B. The results of these tests are listed in Table 1.

TABLE 1

| | Color Yield in CDU's (Normalized) | | |
|---|---|---|---|
| % Dye | Dye of Formula (A) | Dye of Formula (B) | 66%:33% mixture of Dyes (A) and (B); Example 2 |
| 0,2 | 0,182 | 0,116 | 0,184 |
| 0,5 | 0,42 | 0,237 | 0,415 |
| 1,0 | 0,793 | 0,46 | 0,78 |
| 2,0 | 1,515 | 0,881 | 1,522 |
| 3,0 | 2,178 | 1,338 | 2,302 |
| 4,0 | 2,59 | 1,643 | 2,823 |
| 6,0 | 3,011 | 2,259 | 3,658 |
| 8,0 | 2,858 | 2,717 | 4,131 |
| 10,0 | 2,69 | 2,803 | 4,38 |

The results set forth in Table 1 show that, at 3.0 to 10.0% dye concentration, the color yields of the dyestuff mixture according to the invention (Example 2) are suprisingly significantly than the color yields given by the individual dyestuffs of formulae (A) and (B).

What is claimed:

1. A golden yellow to orange dye mixture comprising one or more monoazo dyestuffs corresponding to the general formula (1) and one or more monoazo dyestuffs corresponding to the general formula (2) in a mixing ratio of 80%:20% by weight to 20%:80% by weight and which does not contain a black reactive dyestuff of the general formula (a)

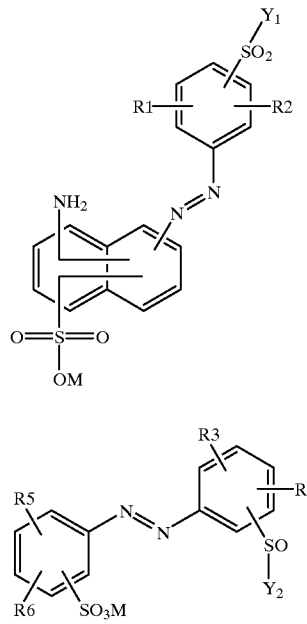

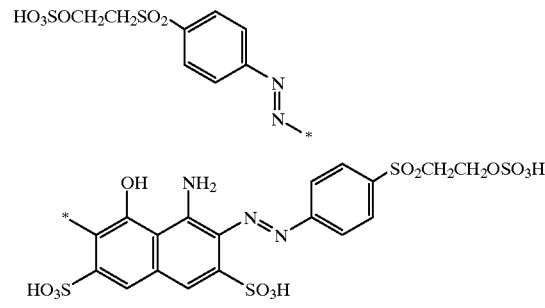

in which
R1 is hydrogen, methyl, ethyl, methoxy, ethoxy, sulfo or carboxy,
R2 has one of the meanings of R1;
R3 has one of the meanings of R2;
R4 has one of the meanings of R3;
R5 is hydrogen, amino, methyl, ethyl, methoxy, ethoxy, or NHX, whereby
X is substituted or unsubstituted $C_1$–$C_4$ Acyl or substituted or unsubstituted benzoyl, phthaloyl or aminocarbonyl
R6 has one of the meanings of R5, provided that R5 and R6 are not simultaneously hydrogen;
$Y_1$ is vinyl or is ethyl which is substituted in the β-position by a substituent which is eliminated by the action of an alkali, forming the vinyl group,
$Y_2$ has one of the meanings of $Y_1$;
M is hydrogen or an alkali metal, such as lithium, sodium and potassium.

2. A method for dyeing hydroxy- and/or carboxamido-containing fiber materials comprising the step of dyeing said materials with a dye mixture as claimed in claim 1.

3. A dye mixture as claimed in claim 1, comprising one or more azo dyestuffs corresponding to the formula (1) and one or more azo dyestuffs corresponding to the formula (2) in a mixing ratio of 70%:30% by weight to 30%:70% by weight.

4. A dye mixture as claimed in claim 3, in which R1 is hydrogen, methoxy or methyl, R2 is hydrogen or methoxy, R3 is hydrogen, methoxy or methyl and R4 is hydrogen or methoxy, and R5 is amino or acetylamino and R6 is amino.

5. A dye mixture according to claim 1, wherein Y is in each instance, independently of the others, vinyl or is ethyl substituted in the β-position by chlorine, thiosulfato, sulfato, alkanoyloxy of 2 to 5 carbon atoms, phosphato, sulfobenzoyloxy or p-toluylsulfonyloxy.

6. A dye mixture according to claim 1, wherein Y is in each instance, independently of the others, vinyl or β-sulfatoethyl.

7. A method for preparing the dye mixture of claim 1 comprising mechanically mixing the individual dyes or synthesizing the dye mixture by means of diazotization and coupling reactions using mixtures of the diazo and coupling components.

* * * * *